(12) United States Patent
Pruess et al.

(10) Patent No.: US 11,920,677 B2
(45) Date of Patent: Mar. 5, 2024

(54) COOLING SCHEME FOR HYDROSTATIC TRANSMISSION

(71) Applicant: Caterpillar Inc., Peoria, IL (US)

(72) Inventors: Christopher W. Pruess, Dunlap, IL (US); Aaron B. Crabtree, Metamora, IL (US); Jeremiah C Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 17/590,273

(22) Filed: Feb. 1, 2022

(65) Prior Publication Data

US 2023/0243419 A1 Aug. 3, 2023

(51) Int. Cl.
*F16H 61/4104* (2010.01)
*F16H 57/04* (2010.01)
*F16H 61/4139* (2010.01)
*F16H 61/4165* (2010.01)

(52) U.S. Cl.
CPC ..... *F16H 61/4104* (2013.01); *F16H 57/0408* (2013.01); *F16H 57/0412* (2013.01); *F16H 61/4139* (2013.01); *F16H 61/4165* (2013.01)

(58) Field of Classification Search
CPC ............. F16H 39/10; F16H 2045/0215; F16H 57/0408; F16H 61/4078; F16H 61/4104; F16H 61/4139; E02F 9/2253
See application file for complete search history.

(56) References Cited

U.S. PATENT DOCUMENTS

| | | | |
|---|---|---|---|
| 3,764,233 A | 10/1973 | Strickland | |
| 4,258,548 A | 3/1981 | Hall, III et al. | |
| 4,627,237 A | 12/1986 | Hutson | |
| 6,263,670 B1 | 7/2001 | Gluck et al. | |
| 6,588,206 B1 | 7/2003 | Hauser et al. | |
| 6,672,058 B1 * | 1/2004 | Langenfeld | B60K 17/105 180/6.3 |
| 6,837,047 B2 | 1/2005 | Dong et al. | |
| 7,337,611 B2 * | 3/2008 | Sakikawa | F16H 39/08 180/291 |
| 8,347,620 B2 * | 1/2013 | Yu | F16H 61/4043 137/240 |
| 9,488,261 B2 | 11/2016 | Mochizuki et al. | |
| 9,759,317 B2 * | 9/2017 | Stammen | F15B 7/006 |
| 10,487,940 B2 * | 11/2019 | Yuan | F16H 47/07 |
| 10,935,117 B1 | 3/2021 | Bennett | |

* cited by examiner

*Primary Examiner* — Michael Leslie
(74) *Attorney, Agent, or Firm* — von Briesen & Roper, s.c.

(57) ABSTRACT

A system including a gearbox and a hydraulic machine connected by a working fluid circuit. The gearbox including a gearbox housing having first and second gearbox fluid passages integrated into the gearbox housing. The hydraulic machine including a case having first and second hydraulic machine fluid passages, the first and second hydraulic machine fluid passages being integrated into the case. A set of rotating elements enclosed within the case. The first gearbox fluid passage and the first hydraulic machine fluid passage align to form a feed passage to conduct fluid at a first pressure from a first source to the set of rotating elements. The second gearbox fluid passage and the second hydraulic machine fluid passage align to form a charge passage to conduct fluid at a second pressure from a second source to the set of rotating elements. The first pressure being less than the second pressure.

19 Claims, 5 Drawing Sheets

COOLING SCHEME FOR HYDROSTATIC TRANSMISSION

TECHNICAL FIELD

The present disclosure relates generally to transmission systems and, more particularly, to cooling of a hydrostatic transmission system.

BACKGROUND

A common feature of many work machines, such as tractors, motor graders, earth moving equipment and the like, is a hydrostatic transmission. Typically, a hydrostatic transmission consists of a hydrostatic pump or motor, driven by an internal combustion engine, which provides a source of pressurized oil flow that causes one or more hydrostatic motors to rotate. Rotation of the motors will cause the work machine to travel in a forward or reverse direction, as commanded by the operator of the work machine.

Hydrostatic transmissions operate in a closed hydraulic circuit, wherein pressurized fluid circulates in a closed loop between the pump and the engine. As such, when a hydrostatic transmission is operated under heavy loads for an extended period of time, for example, the circulating fluid may become heated to an extent that may be undesirable. For example, shaft bearings in the pump or motor are typically lubricated by inherent leakage from the working fluid circuit. As the high temperature fluid travels to the transmission case (in which the bearings operate), the temperature of the fluid rises even further, as the pressure drops adiabatically between the working fluid circuit and the transmission case. Consequently, fluid in the transmission case can be the highest temperature fluid in the system.

As such, in order to remove heated fluid from the closed circuit, a flushing system is typically employed to remove fluid from the circuit. This oil is cooled and replaced through a charge pump. However, keeping components of the transmission cool, such as the bearings mentioned above, requires a high flushing flow, which must be replaced by makeup flow from the charge pump. The power consumed in order to drive the charge pump constitutes a primary source of parasitic loss of closed loop hydraulic systems.

Previous solutions to reduce parasitic loss from the charge pump rely on an open case hydrostatic transmission with external lubrication hoses and lines, such as that described in U.S. Pat. No. 6,263,670 (hereinafter, the '670 Patent). The '670 Patent discloses an open case hydrostatic transmission utilizing a loop flushing line that extends outside the transmission casing, to carry loop flushing oil to other parts of the transmission, and an external lubrication supply line that returns fluid from a reservoir to the transmission. Utilization of the loop flushing line and the lubrication supply line require attaching external hoses and lines to the casing.

SUMMARY

In accordance with one aspect of the present disclosure, a system is disclosed. The system may include a gearbox and a hydraulic machine. The gearbox may include a gearbox housing having a first gearbox fluid passage and a second gearbox fluid passage. The first and second gearbox fluid passages may be integrated into the gearbox housing. The gearbox may further include a plurality of clutch members. The hydraulic machine may be connected to the gearbox by a working fluid circuit, and may include a case and a set of rotating elements enclosed within the case. The case may have a first hydraulic machine fluid passage and a second hydraulic machine fluid passage. The first and second hydraulic machine fluid passages may be integrated into the case. The first gearbox fluid passage and the first hydraulic machine fluid passage may be aligned in one-to-one correspondence to form a feed passage. The feed passage may be configured to conduct fluid at a first pressure from a first source to the set of rotating elements. The second gearbox fluid passage and the second hydraulic machine fluid passage may be aligned in one-to-one correspondence to form a charge passage. The charge passage may be configured to conduct fluid at a second pressure from a second source to the set of rotating elements. The first pressure may be less than the second pressure.

In another aspect of the present disclosure, a variator for a closed circuit hydrostatic transmission is disclosed. The variator may include a case and a hydraulic machine. The case may have a cavity, a feed passage and a charge passage. The feed passage and the charge passage may be integrated into the case. The hydraulic machine may have a set of rotating elements at least partially enclosed within the cavity. The feed passage may be configured to conduct fluid at a first pressure from a first source to the set of rotating elements, and the charge passage may be configured to conduct fluid at a second pressure from a second source to the set of rotating elements. The first pressure may be less than the second pressure.

In a further aspect of the present disclosure, a hydraulic circuit for a transmission of a work machine is disclosed. The hydraulic circuit may include a pump, a motor, a charge supply line and a feed supply line. The motor may be fluidly connected to the pump via a loop line, and the motor and the pump may be enclosed within a case of a variator. The feed supply line may be configured to conduct feed fluid from a first source to the pump or the motor, and the feed fluid may have a first pressure. The charge supply line may be configured to conduct charge fluid from a second source to the loop line, and the charge fluid may have a second pressure. The first pressure may be less than the second pressure.

These and other aspect and features of the present disclosure will be better understood upon reading the following detailed description when taken in conjunction with the accompanying drawings.

DETAILED DESCRIPTION

Reference will now be made in detail to specific embodiments or features, examples of which are illustrated in the accompanying drawings, Wherever possible, corresponding or similar reference numbers will be used throughout the drawings to refer to the same or corresponding parts.

Figure 1:
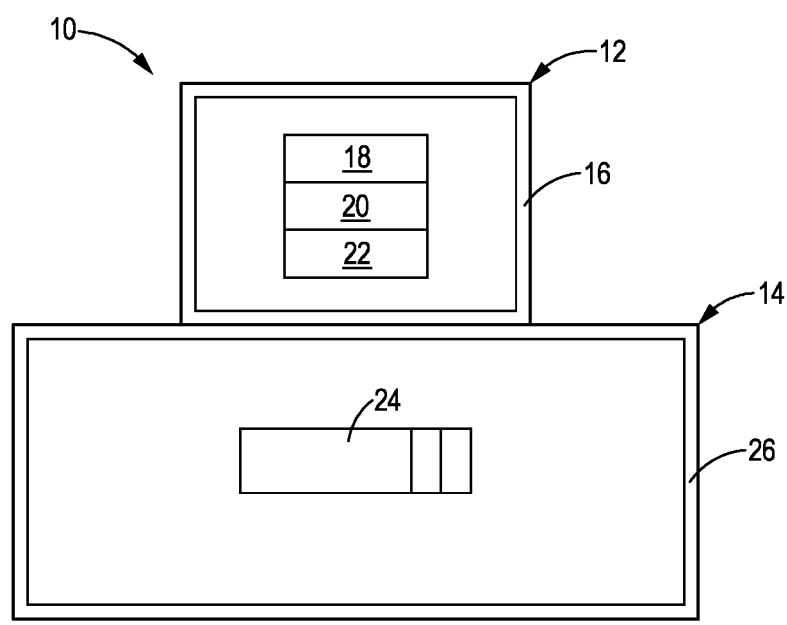
FIG. 1 is a schematic illustration of an exemplary transmission system constructed in accordance with the present disclosure.

FIG. 1 is a schematic illustration of a transmission system 10 of a work machine, according to an embodiment of the present disclosure. The system 10, as illustrated, may be a power split transmission including a variator 12 coupled to a gearbox 14; however, while a specific implementation is described herein, the system 10 may be of any type of transmission having appropriate components for performance of the techniques described herein. In the exemplary embodiment, for example, the gearbox 14 is a multi-speed gearbox configured to provide a range of transmission ratios. Such a gearbox may also be known by those of skill in the art as a planetary differential with multiple discrete forward and reverse gear ratios.

The variator 12 may be configured to drive the gearbox 14, in order to provide smooth transitions through gearing ranges, and may generally include an actuator 18, a motor 20 and a pump 22 that may be enclosed within a case 16. In one embodiment, the motor 20 may be a hydraulic motor, and the pump 22 may be a hydraulic pump, such as a variable displacement pump, for example. The actuator 18 may be configured to activate/deactivate the pump 22, which may be mechanically connected to the actuator. In other embodiments, however, the actuator 18 may be also, or alternatively, be mechanically connected to the motor 20, such that it may be configured to activate/deactivate the motor. The actuator 18, motor 20 and pump 22 may be operably fluidly connected within a closed working fluid circuit 50, illustrated schematically in FIG. 5, and discussed in further detail below. The gearbox 14 may include one or more clutch members 24, configured to select discrete gear ratios and transmission output rotation direction, which may be encased within a gearbox housing 26.

Figure 2:
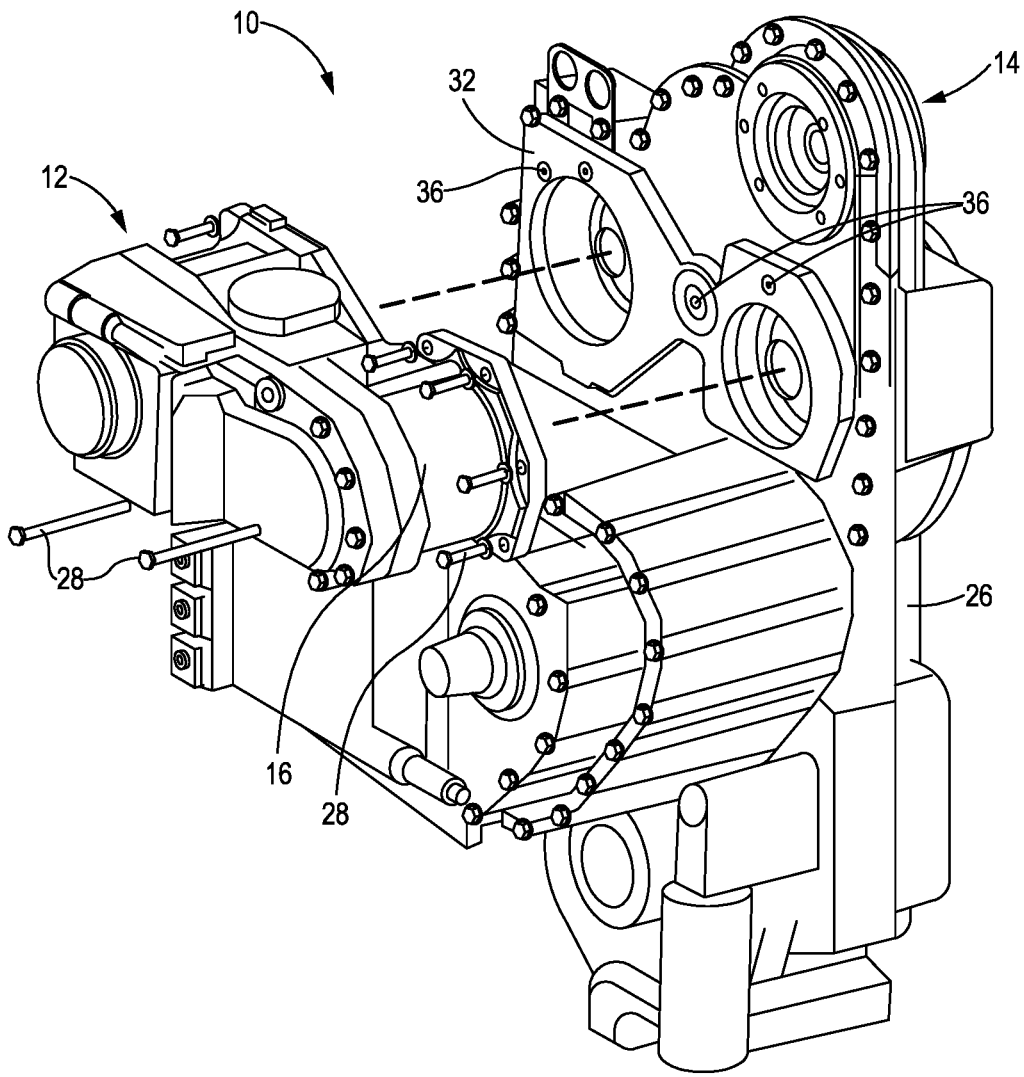
FIG. 2 is an exploded perspective view of an exemplary transmission system constructed in accordance with the present disclosure.
Figure 3:
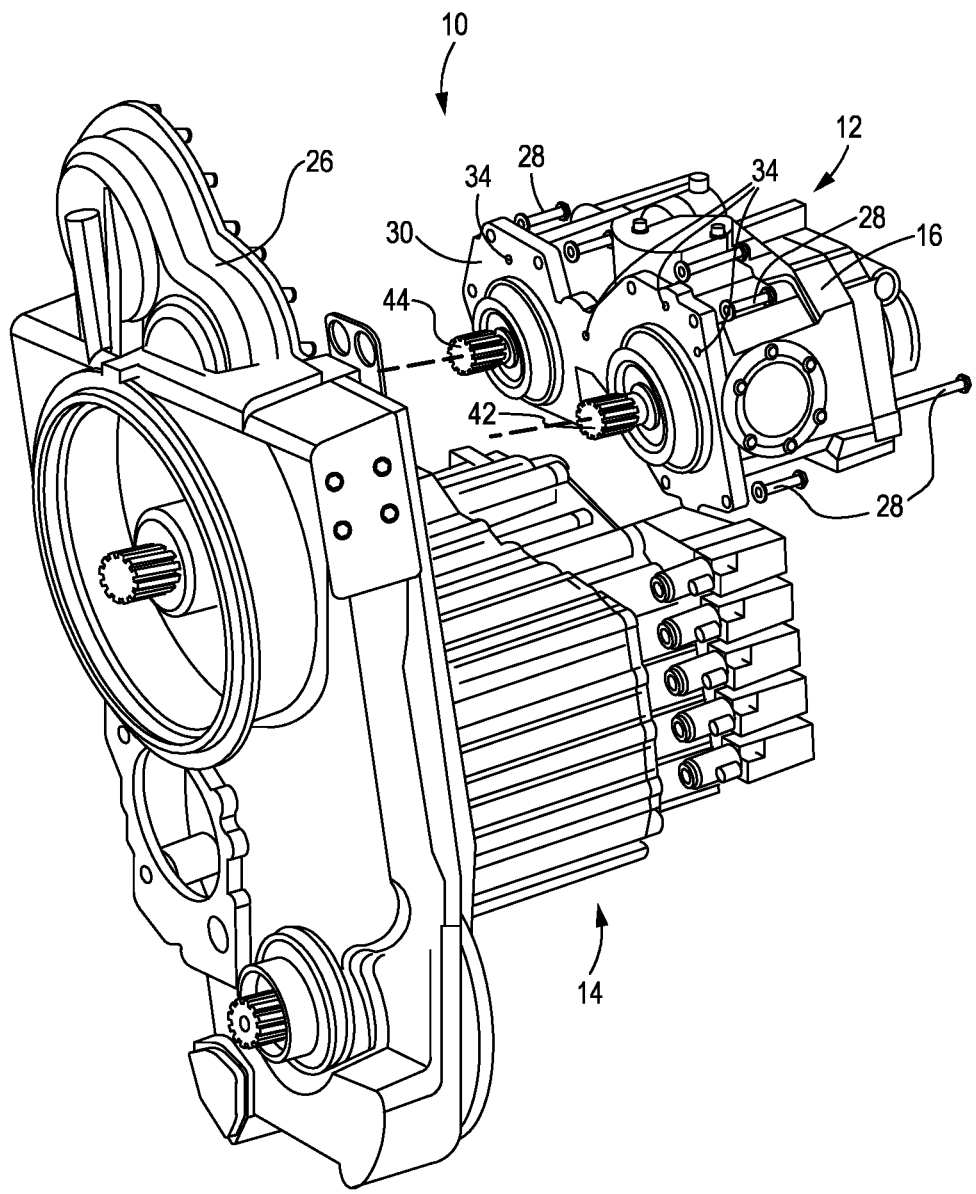
FIG. 3 is an exploded perspective view of an exemplary transmission system constructed in accordance with the present disclosure.
Figure 4:
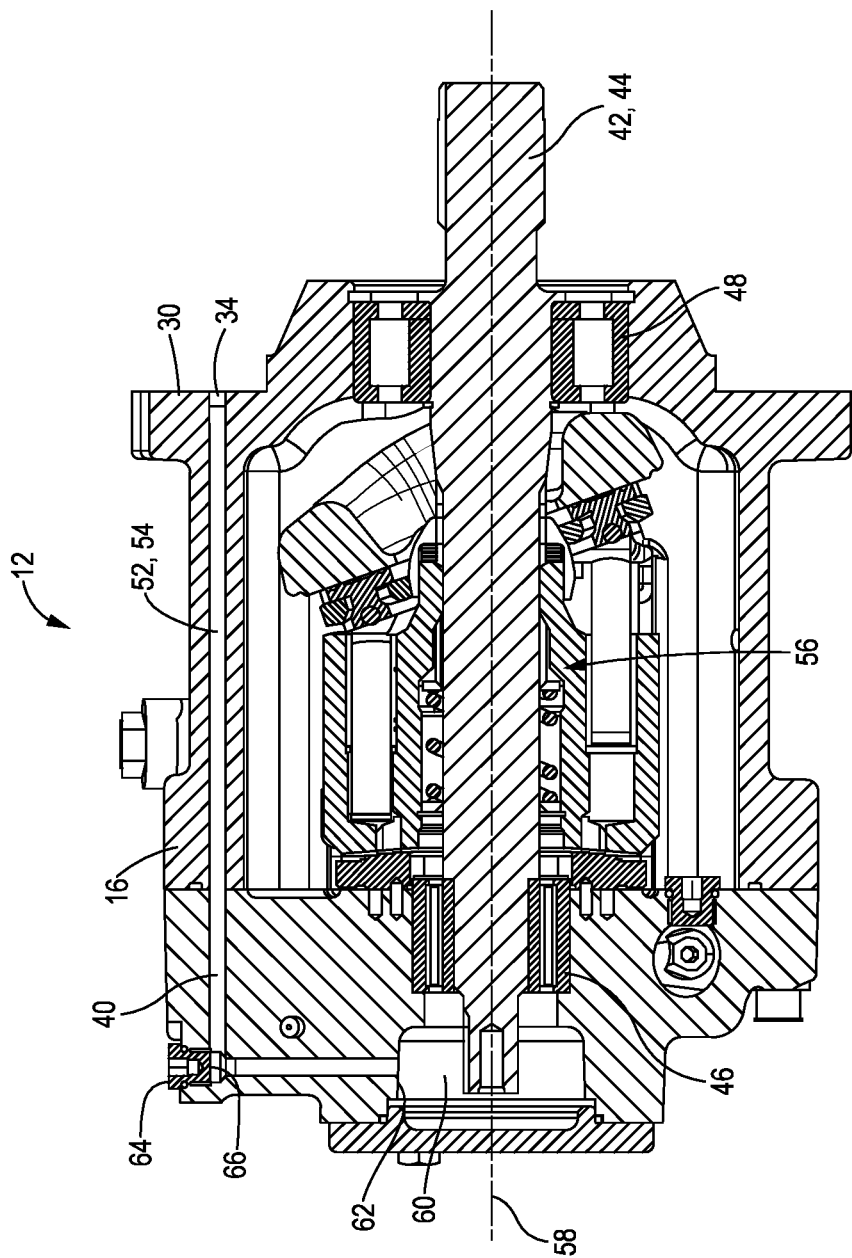
FIG. 4 is a cross-sectional view of a variator of an exemplary transmission system constructed in accordance with the present disclosure.

Referring now to FIGS. 2-4, with continued reference to FIG. 1, the variator 12 may be mounted to the gearbox 14 using one or more fasteners 28. The fasteners 28 may include, but are not limited to, bolts or screws. The case 16 of the variator 12 and the gearbox housing 26 may include corresponding mounting faces 30, 32, such that the variator mounting face 30 may form a flush contact with the gearbox mounting face 32, once the variator 12 and the gearbox 14 are coupled together. Furthermore, one or more variator ports 34 disposed in the variator mounting face 30 may be fluidly connected in one-to-one correspondence with one or more gearbox ports 36 disposed in the gearbox mounting face 32 when the variator 12 and the gearbox 14 are coupled together, thereby forming a plurality of fluid passageways 40 configured to conduct hydrostatic fluid (i.e. hydrostatic oil) between the gearbox 14 and the variator 12. In such an embodiment, the fluid passageways 40 may be entirely integrated into the variator case 16 and the gearbox housing 26, such that no external hoses, external tubes, or the like are used to fluidly connect any fluid passageways extending within and between the variator 12 and the gearbox 14.

As noted above, the variator may include a motor 20 and a pump 22. In one embodiment, for example, the motor 20 may be a fixed displacement motor and the pump 22 may be a variable displacement pump, although other types of motors and pumps are also contemplated. The pump 22 may include an input shaft 42 driven by a power source (not shown), such as an internal combustion engine of the work machine, for example. The pump 22 may be hydraulically connected to the motor 20 (see FIG. 5), such that the pump may control a flow or pressure of fluid to the motor and consequently, the speed and/or torque of an output shaft 44 of the motor, Both the input shaft 42 and the output shaft 44 are supported within the variator case 16 and rotate about a first shaft bearing 46 and a second shaft bearing 48 held within the case.

FIG. 4 illustrates a cross-sectional view of the variator 12. The view illustrated in FIG. 4 may correspond to either a cross-sectional view of the motor 20 or the pump 22. As such, the following description of the illustrated components of FIG. 4 applies to components and associated with, and functionality of, both the motor 20 and the pump 22. For example, the illustrated shaft 42, 44 may correspond to either the input shaft 42 or the output shaft 44, and an illustrated feed passage 52, 54 may correspond to either a pump feed passage 52 or a motor feed passage 54 (see FIG. 5), and so on.

The variator case 16 houses a closed loop pump and motor rotating group, indicated generally at 56. The rotating group 56 may include a shaft 42, 44 configured to rotate about an axis 58 and supported within the case 16 by the first shaft bearing 46 and the second shaft bearing 48. During operation of the closed loop hydraulic pump and motor, a "controlled leak" or flushing system is employed to remove hot oil from the main loop line 80 of the working fluid circuit 50, thereby cooling the shaft 42, 44 and shaft bearings 46, 48, However, because the temperatures of the fluid within the variator case 16 can reach the highest within the entire transmission system 10, a high flushing flow is often required. The heated flushing flow must then be cooled and replaced by makeup flow from a charge pump (not shown) (i.e. "charge fluid"). The power to drive the charge pump causes a parasitic loss in closed loop hydraulic systems, since the pressure at which the charge fluid is returned to the circuit is typically between 2 MPa and 3.5 MPa.

Accordingly, the present transmission system 10 allows reduced flushing flow and corresponding increase in loop temperature by providing for a separate source of low-pressure fluid flow for lubrication and cooling of the shaft bearings 46, 48 and shaft 42, 44. More specifically, as illustrated in FIG. 4, the variator case 16 includes the pump feed passage 52 and the motor feed passage 54, which are formed within, and therefore integrated into, the variator case. Both the pump feed passage 52 and motor feed passage 54 may be fluid passageways 40 configured to conduct hydrostatic fluid between the gearbox 14 and the variator 12 without the use of external hoses, external tubes, or the like. The feed passage 52, 54 may supply the low-pressure fluid to lubricate and cool the shaft 42, 44 and shaft bearings 46, 48 at a lower pressure than that of the charge fluid, such as between 50 kPa and 200 kPa, for example.

The low-pressure fluid may enter the feed passage 52, 54 via the variator port 34, which may be fluidly connected in one-to-one correspondence with one of the gearbox ports 36 disposed in the gearbox 14. The low-pressure fluid may then travel along the feed passage 52, 54, through an orifice 62 in the case 16, and into a cavity 60 surrounding the rotating group 56. As illustrated, a plug 64 may be used to seal an orifice 66 in the case 16 that may connect to the feed passage 52, 54. In an alternative embodiment, however, the low-pressure fluid may enter the feed passage 52, 54 via the orifice 66. Once in the cavity 60, the low-pressure fluid may pass through the first shaft bearing 46, and therein mix with "leakage" from the rotating group 56. This mixture may pass through the cavity 60 and drain through the second shaft bearing 48 into the gearbox 14.

INDUSTRIAL APPLICABILITY in practice, the present disclosure finds utility in various industrial applications, including, but not limited to, construction, paving, transportation, mining, industrial, earth-moving, agricultural, and forestry machines and equipment. For example, the present disclosure may be applied to compacting machines, paving machines, dump trucks, mining vehicles, on-highway vehicles, off-highway vehicles, earth-moving vehicles, agricultural equipment, material handling equipment, and/or any work machine including a hydrostatic transmission. More particularly, the present disclosure provides a closed case hydrostatic transmission with a separate source of low-pressure hydrostatic fluid supplied at a pressure lower than the charge, makeup or boost fluid, and which is applied directly to the shaft bearings and/or case of the pump and/or motor of the transmission system.

Figure 5:
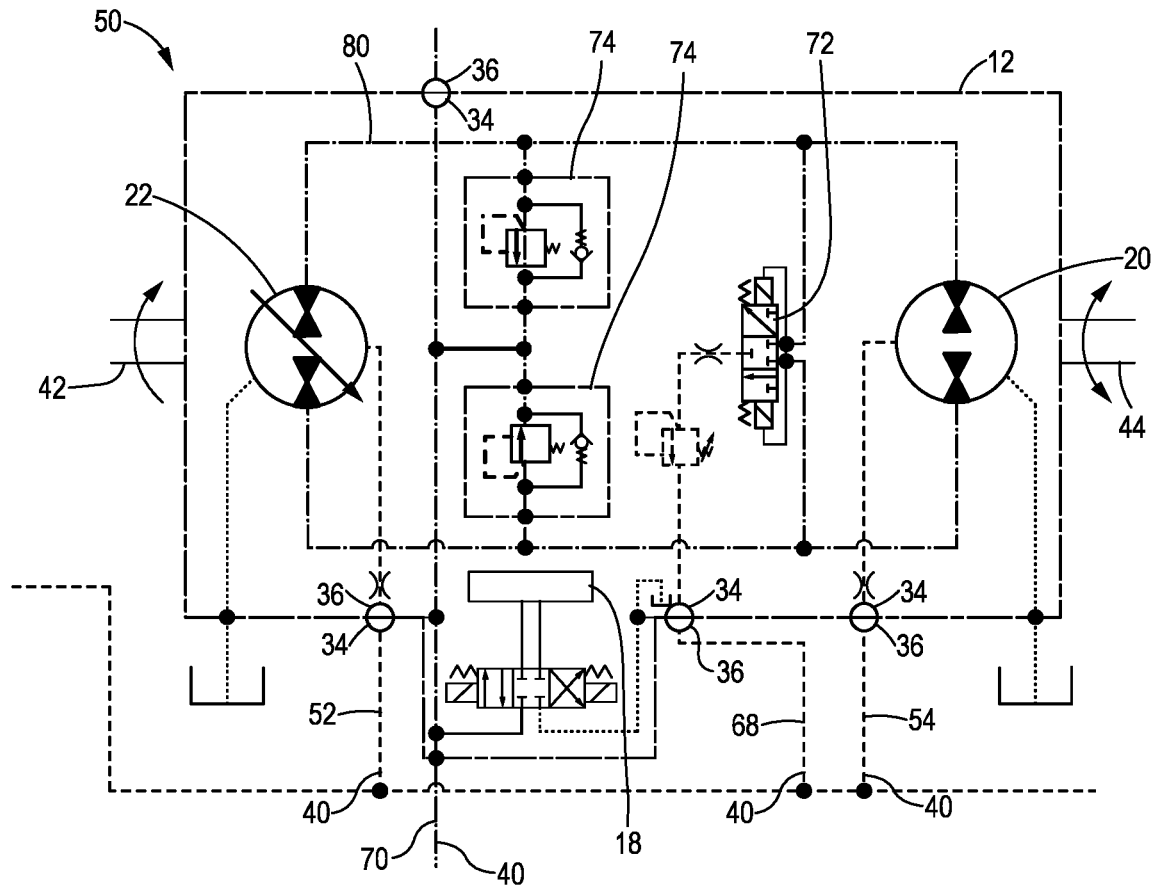
FIG. 5 is a schematic diagram of a closed hydrostatic working fluid circuit for an exemplary transmission system constructed in accordance with the present disclosure.

The flow of hydrostatic fluid within the transmission system 10 is illustrated by the working fluid circuit 50 illustrated in the schematic of FIG. 5. Namely, the working fluid circuit 50 may be a closed hydrostatic circuit including a main loop line 80 with a pump 22 and a motor 20. The fluid, in applicable applications, may be pressurized hydrostatic fluid (i.e. hydrostatic oil), or may be considered by those of skill in the art to be high pressure fluid. As illustrated, the pump 22 may be fluidly interconnected with, and arranged to operate, the motor 20. The circuit 50 may include a plurality of fluid passageways 40 that may be integrated with, and extend between, the gearbox 14 and the variator 12. The fluid passageways 40 may extend within the variator case 16 and the gearbox housing 26, and as such are plumbed together without the use of external hoses, which can add complexity to manufacturing processes. In addition, external hoses may prove to be costly, as over time, their structural integrity may degrade, forming potential leakage points. The fluid passageways 40 may include a flushing drain passage 68, a charge/makeup supply passage 70, the pump feed passage 52, and the motor feed passage 54.

The flushing drain passage 68 may form part of a flushing system including a flush valve 72, which may sense and drain a regulated quantity of flushing fluid from the main loop line 80 for cooling and lubrication of the rotating components 56 of the pump 22 and/or motor 20, as described above. The flushing fluid may pass from the flush valve 72 within the variator 12 into the flushing drain passage 68 and into the gearbox 14 of the transmission system 10 to be cooled and recirculated.

The leakage or flushing fluid drained from the hydrostatic fluid supply of the main loop line 80 must be replenished. In one embodiment, the charge/makeup supply passage 70 may conduct the flow of charge fluid through the gearbox 14 and into the variator 12 to replenish the hydrostatic fluid in the main loop line 80 that has been lost due to flushing, or the like. This charge fluid may be returned to the circuit at a pressure between 2 Mpa and 3.5 Mpa. In the illustrated embodiment, the charge/makeup supply passage 70 may be fluidly coupled to a plurality of pressure relief valves 74 that may be arranged in parallel to not only limit the fluid pressure within the main loop line 80, but also to charge the charge fluid from the charge/makeup supply passage. The charge/makeup supply passage 70 may be further configured to conduct fluid in the variator 12 to provide actuation control flow for the actuator 18, which may be mechanically connected to the pump 22 and/or the motor 20.

Finally, the pump feed passage 52 and the motor feed passage 54 may provide low-pressure fluid from a separate source (not shown) to the pump 22 or the motor 20 at a pressure lower than that of the charge fluid pressure. In an embodiment, the low-pressure fluid may be provided at a pressure typically between 50 kPa and 200 kPa. The pump feed passage 52 may conduct the low-pressure fluid to the rotating group 56, namely the input shaft 42 and the first and second shaft bearings 46, 48, of the pump 22. The motor feed passage 54 may conduct the low-pressure fluid to the rotating group 56, namely the output shaft 44 and the first and second shaft bearings 46, 48 of the motor 20. In this arrangement, the volume of pressurized charge fluid required by the transmission system 10 is reduced and, consequently, the parasitic loss of the transmission system is reduced.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A system, the system comprising:
    a gearbox, the gearbox including:
        a gearbox housing having a first gearbox fluid passage and a second gearbox fluid passage, the first and second gearbox fluid passages being integrated into the gearbox housing, and
        a plurality of clutch members; and
    a hydraulic machine connected to the gearbox by a working fluid circuit, the hydraulic machine including:
        a case having a first hydraulic machine fluid passage and a second hydraulic machine fluid passage, the first and second hydraulic machine fluid passages being integrated into the case, and
        a set of rotating elements enclosed within the case,
    wherein the first gearbox fluid passage and the first hydraulic machine fluid passage are aligned in one-to-one correspondence to form a feed passage, the feed passage configured to conduct fluid at a first pressure from a first source to the set of rotating elements, wherein the second gearbox fluid passage and the second hydraulic machine fluid passage are aligned in one-to-one correspondence to form a charge passage, the charge passage configured to conduct fluid at a second pressure from a second source to the set of rotating elements, and wherein the first pressure is less than the second pressure.

2. The system of claim 1, wherein the system is a power split transmission.

3. The system of claim 1, wherein the hydraulic machine is a hydraulic pump or a hydraulic motor.

4. The system of claim 1, wherein the hydraulic machine is a variator including a hydraulic pump and a motor.

5. The system of claim 4, wherein the working fluid circuit includes a pair of feed passages, one of the pair of feed passages configured to conduct fluid to the hydraulic pump, and another of the pair of feed passages configured to conduct fluid to the motor.

6. The system of claim 4, wherein the case is a closed case.

7. The system of claim 1, wherein the first gearbox fluid passage and the first hydraulic machine fluid passage are connected without the use of external hoses.

8. The system of claim 1, wherein the second source is a charge pump configured to supply pressurized fluid to the working fluid circuit.

9. A hydraulic variator for a power split transmission, the variator comprising:

a case having a cavity, a feed passage and a charge passage, the feed passage and the charge passage being integrated into the case, the case being a closed case; and a hydraulic machine having a set of rotating elements at least partially enclosed within the cavity, the feed passage configured to conduct fluid at a first pressure from a first source to the set of rotating elements, the charge passage configured to conduct fluid at a second pressure from a second source to the set of rotating elements, the first pressure being less than the second pressure.

10. The hydraulic variator of claim 9, wherein the hydraulic machine is a pump or a motor.

11. The hydraulic variator of claim 9, wherein the second source is a charge pump configured to pressurize the fluid to the second pressure.

12. The hydraulic variator of claim 9, wherein the feed passage conducts cooled fluid through the feed passage and the set of rotating elements is cooled upon contact with the fluid conducted through the feed passage.

13. A hydraulic circuit for a power split transmission of a work machine, the hydraulic circuit comprising:

a pump;

a motor fluidly connected to the pump via a loop line, the pump and the motor enclosed within a closed case of a variator;

a feed supply line configured to conduct feed fluid from a first source to the pump or the motor, the feed fluid having a first pressure; and a charge supply line configured to conduct charge fluid from a second source to the loop line, the charge fluid having a second pressure, the first pressure being less than the second pressure.

14. The hydraulic circuit of claim 13, wherein the feed supply line extends from the first source through the case of the variator to the pump or the motor.

15. The hydraulic circuit of claim 13, wherein the hydraulic circuit includes a pair of feed supply lines, one of the pair of feed supply lines configured to conduct the feed fluid from the first source through the case of the variator to the pump, the other of the pair of feed supply lines configured to conduct the feed fluid from the first source through the case of the variator to the motor.

16. The hydraulic circuit of claim 13, further including a flushing valve coupled to the loop line and a flushing line, wherein the flushing valve regulates drainage of a quantity of fluid from the loop line through the flushing line.

17. The hydraulic circuit of claim 16, wherein the Charge fluid conducted through the charge supply line replenishes the quantity of fluid drained from the loop line through the flushing line.

18. The hydraulic circuit of claim 13, wherein the power split transmission includes a gearbox fluidly connected to a variator via the feed supply line and the charge supply line.

19. The hydraulic circuit of claim 13, Wherein the feed supply line is integrated within the case of the variator, and wherein the feed fluid cools the case of the variator as it is conducted through the feed supply line.

* * * * *